Dec. 24, 1968          D. KLEIST          3,418,095
METHOD AND APPARATUS FOR PRODUCING FIBERS
Filed Feb. 12, 1968                    4 Sheets-Sheet 1

INVENTOR
DALE KLEIST
BY
ATTORNEYS

INVENTOR
DALE KLEIST
BY
ATTORNEYS

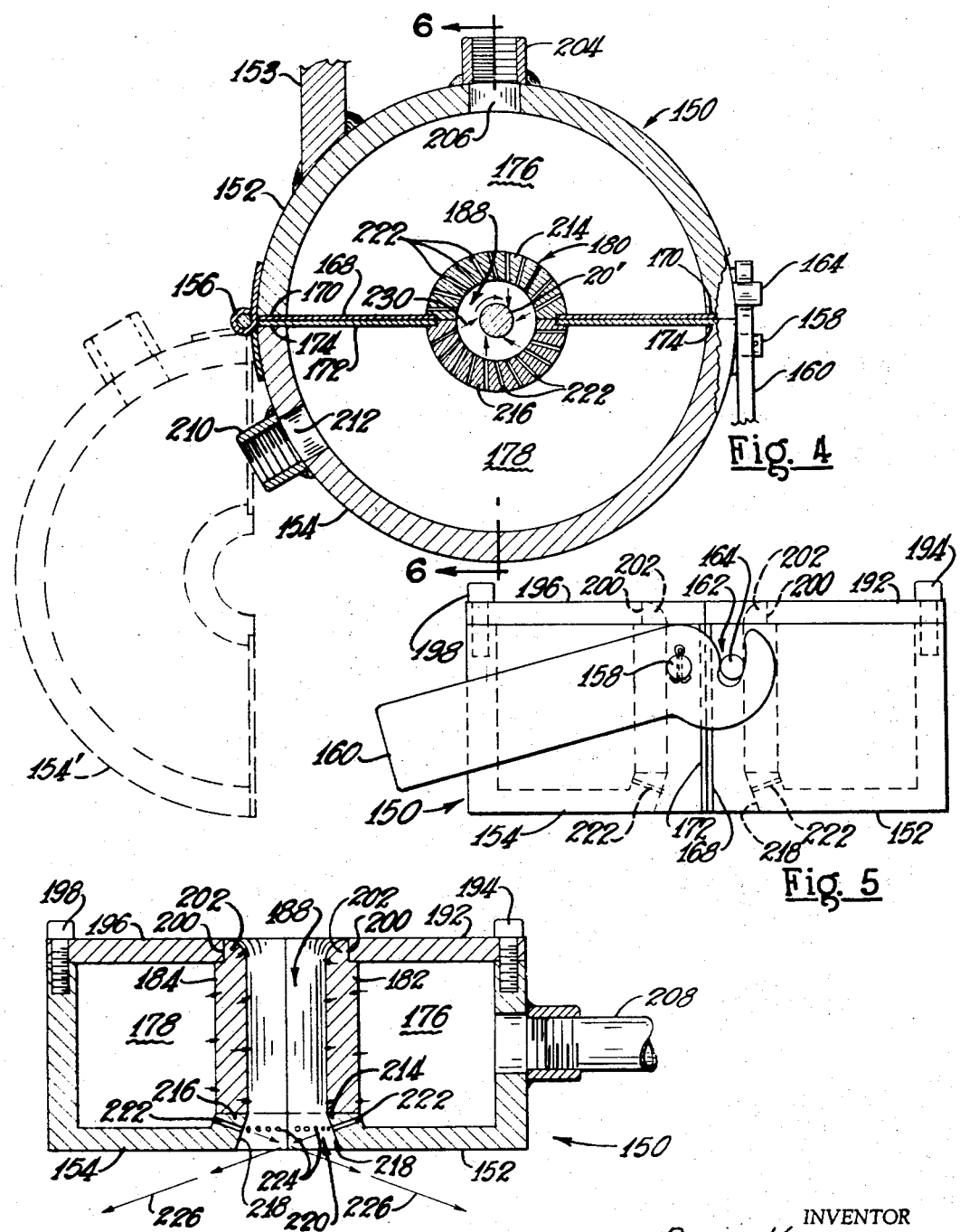

Dec. 24, 1968  D. KLEIST  3,418,095
METHOD AND APPARATUS FOR PRODUCING FIBERS
Filed Feb. 12, 1968  4 Sheets-Sheet 4
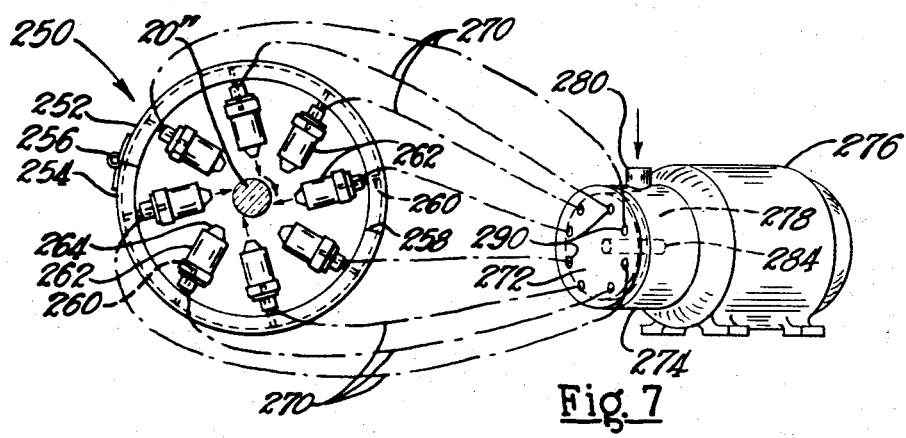
Fig. 7
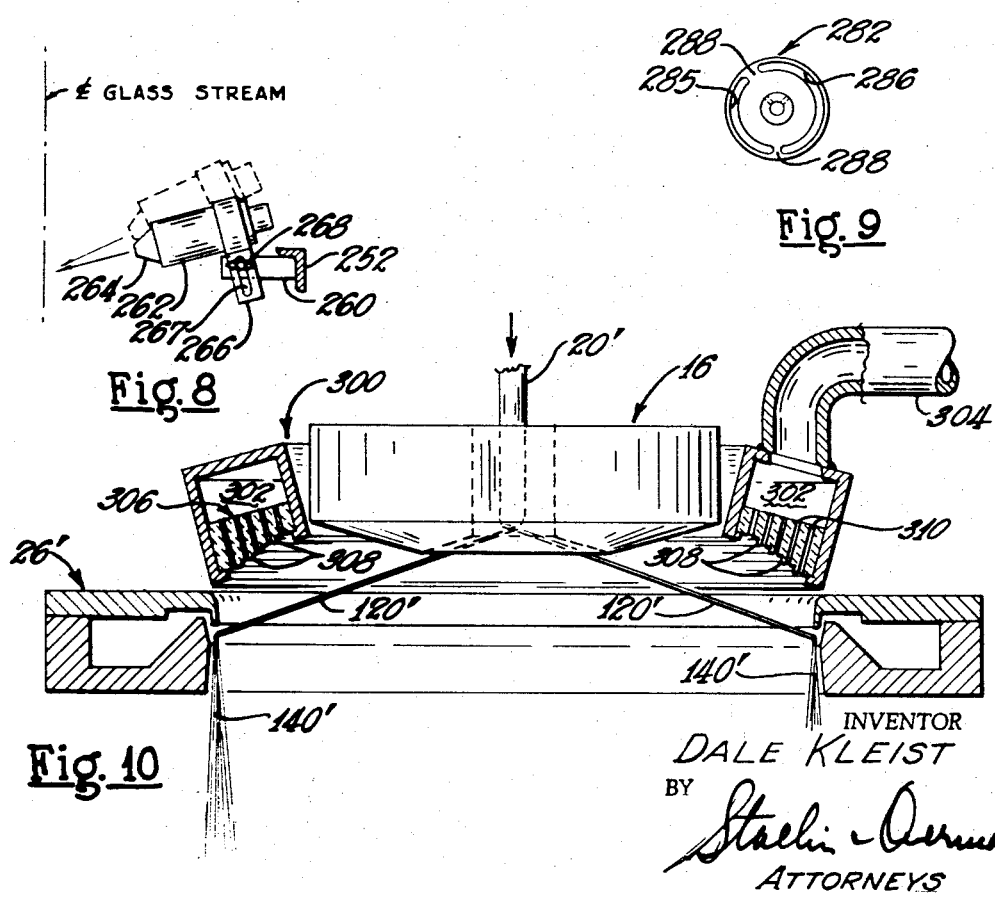
Fig. 8
Fig. 9
Fig. 10
INVENTOR
DALE KLEIST
BY
ATTORNEYS

United States Patent Office 3,418,095
Patented Dec. 24, 1968

3,418,095
METHOD AND APPARATUS FOR PRODUCING FIBERS
Dale Kleist, St. Louisville, Ohio, assignor to Owens-Corning Fiberglas Corporation, a corporation of Delaware
Continuation-in-part of application Ser. No. 499,181, Oct. 21, 1965. This application Feb. 12, 1968, Ser. No. 704,749
14 Claims. (Cl. 65—5)

ABSTRACT OF THE DISCLOSURE

The disclosure embraces a method of and apparatus for forming fibers from heat-softened mineral material, such as glass, wherein a stream of the molten material or glass is engaged by tangentially directed high velocity jets of gas subdividing the stream into linear bodies or primary filaments which are projected by the jets of gas into an annular attenuating blast which attenuates the bodies or primary filaments to fibers.

---

This is a continuation-in-part of application Ser. No. 499,181 filed Oct. 21, 1965, now abandoned.

This invention relates to a novel method of and apparatus for forming fibers from heat-softenable materials and more especially to a method of and apparatus for forming glass fibers from a free falling stream of molten glass through the application of forces acting directly on the glass stream for subdividing or disintegrating the glass of the stream into bodies or primary filaments suitable for attenuation to filaments by other forces.

One method that has come into extensive use in forming fibers from a glass stream involves the use of a hollow rotor having a peripheral wall perforated with a large number of orifices or openings, the stream being delivered into the hollow rotor and under the influence of high speed rotation of the rotor, the molten glass is projected through the orifices of the rotating rotor forming primary filaments or discrete linear bodies projected into an annular attenuating blast wherein they are attenuated to fine fibers or filaments.

While this method is satisfactory in the commercial production of fibers or filaments for use in producing mats or masses of fibers for various purposes, the method necessarily involves the use of a high speed metal rotor operating under extremely high temperature conditions whereby the rotor life is comparatively short. The rotor construction is comparatively expensive as a metal must be employed which is resistant to the high temperatures of the molten glass and the large number of orifices in the peripheral wall of the rotor must be accurately dimensioned and positioned so as not to seriously impair the strength of the rotor to resist centrifugal forces or the dynamic balance of the rotor. The primary filaments or individual bodies of glass projected under the influence of centrifugal forces from the rotor are subjected to the retarding effect or drag of the ambient air tending to cause the molten glass to abrade the metal defining the orifices whereby the orifices become worn to elliptical shape, thus impairing the formation of primary filaments or linear bodies suitable for attenuation to fine fibers.

It has been found that all of the orifices are not worn or abraded to the same extent and hence primary filaments or bodies of varying sizes are formed, this condition fostering the attenuation of the bodies of fibers of nonuniform size.

The present invention relates to a method of forming primary filaments or discrete linear bodies from a stream of molten glass and attenuating the primary filaments to fine fibers or filaments without the use of a rotating spinner of rotor or other moving components.

Another object of the invention resides in a method of subjecting a stream of molten material, such as glass, to forces directed generally tangentially of the stream throughout the periphery thereof to disintegrate or subdivide the glass into a large number of primary filaments or individual linear bodies which are directed by the tangentially applied forces into an annular gaseous attenuating blast for continuous attenuation of the primary filaments or bodies to fine fibers.

Another object of the invention resides in a method wherein the molten glass of the stream, during its formation into primary filaments and the attenuation of the primary filaments to fine fibers or filaments, does not contact moving components whereby heat losses are reduced to a minimum and without contamination of the glass.

Another object of the invention resides in a method of and apparatus for producing fine fibers or filaments from a stream of glass of substantial size enabling the use of low cost, low viscosity glasses.

Another object of the invention embraces a method of forming fibers from molten glass wherein a stream of molten glass is subdivided into primary filaments by the application of forces directed generally tangentially into engagement with the glass stream whereby the primary filaments at high temperatures are delivered into an attenuating blast with a minimum of heat losses and high fiber yield attained without the use of moving components.

Another object of the invention resides in a relatively stationary apparatus arranged to accommodate a free falling glass stream and fashioned to direct jets of high velocity fluid into engagement with the glass of the stream for subdividing or disintegrating the stream into primary filaments and conveying the primary filaments into an annular gaseous blast for attenuation to fine fibers.

Another object of the invention is the provision of a relatively stationary means fashioned with an internal combustion burner chamber of annular shape and a passage accommodating a stream of molten glass, the chamber having orifices for delivering high velocity jets of hot gases of combustion into engagement with the glass of the stream to break up the glass into individual linear bodies or primary filaments suitable for blast-attenuation into fine fibers or filaments.

A further object of the invention is the provision of a relatively stationary means or fiberizing unit fashioned with a combustion chamber from which high velocity jets of hot gases are delivered in directions tangentially of a glass stream for subdividing the glass of the stream into linear bodies without the use of mechanical components, and attenuating the projected bodies into fine fibers with a high degree of energy efficiency, the fiberizing unit being of compact construction facilitating the utilization of a plurality of the units in closely arranged relation along a glass supply forehearth to attain a high production yield of fibers.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 4 is a sectional view illustrating a modified form of glass processing unit of the invention;

FIGURE 5 is an elevational view of the construction shown in FIGURE 4 in operative condition;

FIGURE 6 is a vertical sectional view taken substantially on the line 6—6 of FIGURE 4;

FIGURE 7 is a top plan view of a modified form of apparatus for processing glass;

FIGURE 8 is an enlarged elevational view of one of the components shown in FIGURE 7;

FIGURE 9 is a detail view of a valve means forming a component of the apparatus shown in FIGURE 7, and FIGURE 10 is a view similar to FIGURE 2 illustrating a modified arrangement of the invention.

While the method and apparatus of the invention are particularly adaptable for processing heat-softenable material, such as heat-softened glass, in a manner to form primary filaments or linear bodies of the glass of the stream suitable for attenuation to fibers, it is to be understood that the method and apparatus may be employed for processing other heat-softened materials.

Figure 1:
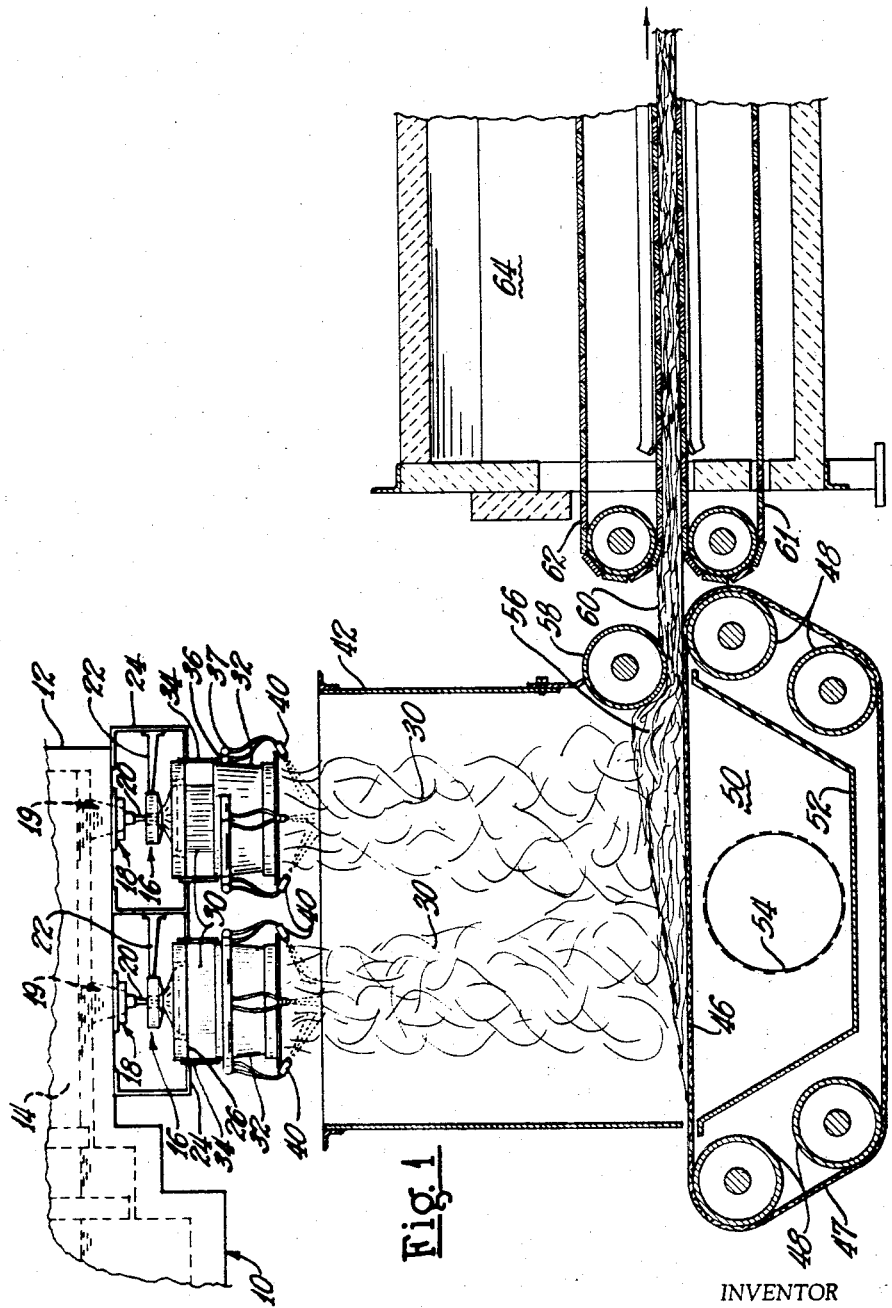
FIGURE 1 is an elevational view showing a group of glass processing or fiber attenuating units of the invention in association with fiber collecting means.

Referring to the drawings in detail and initially to the arrangement shown in FIGURE 1, there is illustrated a group of glass processing or fiberizing units of the invention arranged to form and deliver attenuated fibers onto a moving collector for forming fibrous mats or other similar products. The arrangement shown in FIGURE 1 is inclusive of a melting furnace 10 of conventional construction for melting and refining heat-softenable material, such as glass, a forehearth 12 extending from the melting furnace and having a channel 14 receiving heat-softened and refined glass from the furnace 10 providing a supply of refined molten glass for the glass processing units.

In the embodiment illustrated two glass processing units 16 are disposed along and beneath the floor of the forehearth 12, it being understood that a greater number of processing units may be employed if desired.

Disposed beneath and secured to the floor of the forehearth 12 are stream feeders or bushings 18, there being one feeder 18 for each processing unit, and each feeder receiving molten glass from the forehearth channel through a passage 19.

As hereinafter described, each of the processing units 16 is adapted to subdivide or break up a glass stream 20 flowing from a feeder 18 into primary filaments or discrete linear bodies which are attenuated into fine fibers or filaments by annularly-shaped attenuating blasts. Each of the processing units 16 is mounted upon a support member 22 carried by a supporting frame structure 24. Disposed adjacent and beneath each processing unit 16 and supported by the frame structure 24 is an annular manifold or chamber 26 from which is delivered a high velocity, annularly-shaped blast as hereinafter described which attenuates the primary filaments or linear bodies delivered from a unit 16 into fine fibers or filaments 30.

Supported beneath each blast delivery means or blower 26 is a circular sleeve or shield 32 suspended by members 34 from the frame structure 24. Mounted on each of the sleeves 32 are annular headers or manifolds 36 and 37, one manifold being connected with a supply of binder and the other connected with a supply of fluid utilized as a vehicle for the binder. Disposed circumferentially around the lower end of each sleeve member 32 are nozzles 40 arranged to direct the binder entrained in the fluid vehicle onto the newly formed fibers 30.

The fibers move downwardly under the influence of the attenuating blasts into a hood or receptacle 42, the fibers being collected in mass formation upon the upper flight 46 of an endless belt conveyor 47 of the foraminous or reticulated type. The conveyor 47 is supported by rolls 48, one of which is driven by conventional means (not shown). Positioned beneath the upper flight 46 of the conveyor in registration with the enclosure or hood 42 is a chamber 50 provided by a receptacle 52, the latter being connected with a suction blower (not shown) by a pipe 54 for establishing subatmospheric or reduced pressure in the chamber 50.

The reduced pressure in the chamber 50 assists in the collection of the fibers 30 upon the conveyor flight 46, the reduced pressure conveying away the spent gases of the attenuating blasts. The fibers accumulate in a mass 56 which is moved by the conveyor flight 46 beaneth a sizing roll 58 which compresses the fibrous mass to a predetermined thickness providing a fibrous mat 60. The fibrous mat is conveyed by endless belt conveyor means 61 and 62 through an oven or curing zone 64 in which the binder or coating on the fibers is cured or set by the application of heat and circulating air in a conventional manner.

Figure 2:
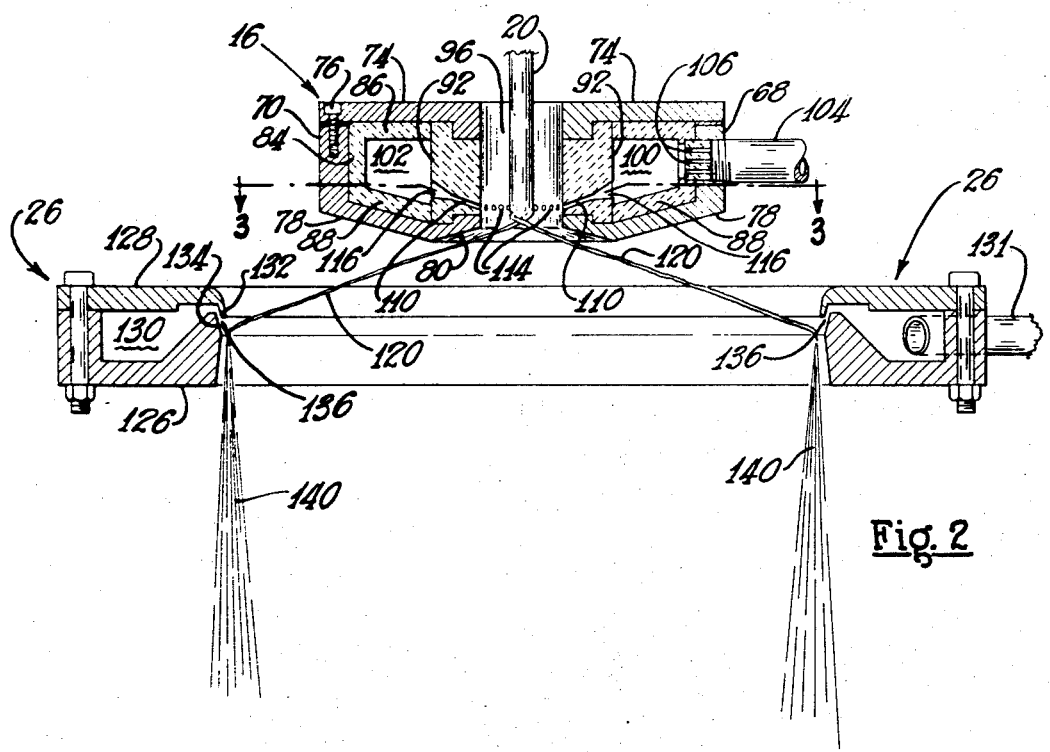
FIGURE 2 is an enlarged sectional view of one of the glass processing and fiber-forming units, the section being taken substantially on the line 2—2 of FIGURE 3.
Figure 3:
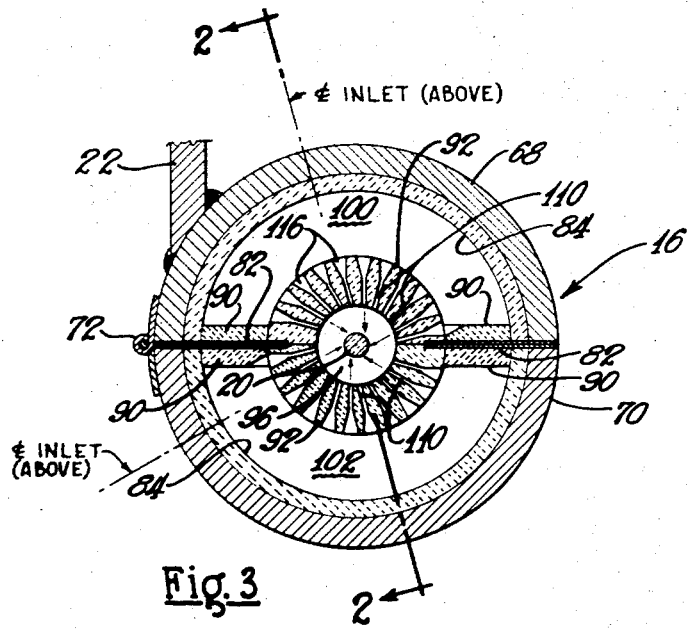
FIGURE 3 is a sectional view taken substantially on the line 3—3 of FIGURE 2.

FIGURES 2 and 3 illustrate one form of glass processing means or unit providing an internal combustion burner producing hot gases for breaking up or subdividing the molten glass of a stream into discrete linear bodies or primary filaments and the bodies or filaments delivered into a gaseous attenuating blast.

The unit or combustion burner 16 is inclusive of a substantially circular housing means comprising two semicircular portions or sections 68 and 70 fashioned of metal. The housing sections 68 and 70 are pivotally joined together by hinge means 72 shown in FIGURE 3, the housing sections being held in closed or mating position by suitable means, such as the latch means illustrated in FIGURE 5 and hereinafter described.

The housing means is comparatively shallow and is provided with a cover means 74 fashioned of two mating sections, a section being disposed on each of the semicircular housing sections 68 and 70, each cover section being secured to its adjacent housing section by screws 76 or other securing means. The lower wall regions of the sections comprising the housing means are fashioned or shaped to provide portions 78 which together form a frusto-conical shape and a second region 80 of frusto-conical shape.

Each of the burner housing sections 68 and 70 at their mating zone is provided with a metal wall 82 which, in closed or operative positions of the housing sections, form a partition means as shown in FIGURE 3. The interior walls of the mating housing sections 68 and 70 are lined with refractory, the lining including refractory 84 at the peripheral interior, an upper portion of refractory 86 adjacent the cove means 74, a lower refractory portion 88 contiguous with the frusto-conical shaped portions 78, and refractory 90 contiguous with the partitions 82.

Disposed at the central region of the housing means and within the housing are two semicylindrically-shaped refractory members 92, each formed with a semicylindrical recess, the recesses together providing a passage 96 through the combustion burner. The cover means 74 and the central region of the floor of the housing are formed with semicircular recesses of the same dimension as the passage 96 whereby the recesses in the cover means and the housing portions form a continuation of the cylindrically-shaped passage 96 to accommodate the glass stream 20 which falls by gravity from a feeder through the central axial region of the passage 96.

The refractory members 92 and the refractory linings 84, 86, 88 and 90 together provide two semiannularly-shaped combustion or burner chambers 100 and 102. Each of the chambers 100 and 102 is provided with an inlet pipe 104, one of which is shown in FIGURE 2, for conveying combustible mixture, for example, fuel gas and air into the combustion zones or chambers 100 and 102. The entrance region of the tube 104 into the adjacent combustion chamber is fashioned with a plurality of small passages or channels 106 providing a fire screen to prevent ignition of the combustible mixture in the inlet tubes 104.

Each of the semiannularly-shaped members 92 is fashioned with a plurality of channels or passages 110 which are downwardly inclined toward the longitudinal axis of the passage 96, as shown in FIGURE 2, and are slightly askew with respect to radial axes as shown in FIGURE 3.

The outlets 114 of the passages 110 are preferably arranged in a horizontal row at the interior cylindrical surface defining the passage 96, as shown in FIGURE 2. The entrance regions 116 of the passages 110 are flared to facilitate flow of intensely hot gases of combustion from the chambers 100 and 102 into the channels 110 to promote a high velocity for the combustion gases moving through the channels 110 for delivery from the outlets or orifices 114.

The combustible fuel and air mixture admitted into the chambers 100 and 102 through the inlet pipes 104 is ignited and substantially completely burned within the refractory lined combustion chambers 100 and 102 whereby the gases of combustion in the chambers undergo substantial expansion due to the intense heat so that jets of burned gases of combustion move through the channels 110 and are discharged from the orifices 114 at very high velocities.

As shown in FIGURE 3, the passages or channels 110 are arranged askew with respect to radial axes whereby streams or jets of intensely hot combustion gases are projected in the direction of the arrows as shown in FIGURE 3 whereby each high velocity jet of gas engages the glass stream at a region spaced from its axis. Through this method of directing the high velocity jets of gases into engagement with the glass of the free falling stream, the forces of the jets or gas streams subdivided, disintegrate or break up the glass of the stream into linear bodies or primary filaments 120, and the primary filaments delivered by the velocity of the gases of the jets in the directions indicated in FIGURE 2.

Positioned adjacent the processing unit 16 is an annular blower construction 26 for delivering a high velocity attenuating blast. The annular blower comprises an annularly-shaped hollow housing 126 and a cover 128 providing an annularly-shaped manifold or chamber 130, an inlet means pipe 131 being provided for introducing a fluid, such as steam or compressed air, under pressure into the manifold 130. The cover portion 128 is fashioned with a downwardly extending circular lip or flange 132 which is spaced from a frusto-conical shaped surface 134 formed on the housing 126.

The lip 132 is spaced from the surface 134 to provide an annular slot or orifice 136 through which the steam or compressed air from the manifold 130 is projected at high velocities providing the attenuating blast. The region of the blast delivery orifice 136 is arranged with respect to the paths of trajectory of the primary filaments or linear bodies 120 of molten glass whereby the primary filaments or bodies enter the blast adjacent the blast delivery orifice 136, the high velocity gases of the blast engaging the primary filaments and attenuating them to fine fibers 140.

The channels or passages 110 are preferably downwardly inclined, each at an angle of about seventy degrees with respect to the vertical axis of the cylindrical chamber 96 as this degree of angularity has been found effective to project the primary filaments into the annular high velocity gaseous blast delivered through the annular slot 136 and attenuated by the blast to fibers. The passages or channels 110 may be directed downwardly at a slightly more acute angle than seventy degrees but should preferably not exceed an acute angle less than sixty degrees with respect to the vertical axis of the chamber 96.

The gases of combustion in the combustion chambers 100 and 102 are delivered through the channels or passages 110 at linear velocities in a range between forty thousand and sixty-six thousand feet per minute, and preferably at a velocity of about sixty thousand feet per minute providing the high velocity jets for subdividing the glass of the stream 20 into primary filaments.

The steam or compressed air from the annular orifice 136, providing the high velocity blast engaging the primary filaments 120 and attenuating the glass of the filaments to fibers of varying lengths, is delivered from the annular orifice at linear velocities in a range of from fifty thousand and seventy-five thousand feet per minute. It is found that a blast of a linear velocity of about seventy thousand feet per second is preferred.

A glass composition usable for forming fibers according to the invention is as follows:

| | Percent |
|---|---|
| $SiO_2$ | 35 |
| $Fe_2O_3$ | 30 |
| CaO | 18 |
| $Al_2O_3$ | 10 |
| PbO | 5 |
| ZnO | 2 |

The temperature of the above glass composition for the stream 20 should be maintained between 2500° F. and 2600° F. The viscosity range of the molten glass between the stated temperatures is 11 poises to 8 poises, and the glass in this viscosity range has been found satisfactory for forming fibers, the viscosity being preferably about 10 poises.

Another glass composition usable for forming fibers in the method described is as follows:

| | Percent |
|---|---|
| $SiO_2$ | 42 |
| $Al_2O_3$ | 9.34 |
| CaO | 38.76 |
| $SO_3$ | 1.64 |
| $Fe_2O_3$ | 7 |
| $Na_2O_3$ | 0.32 |
| $K_2O$ | 0.47 |
| $TiO_2$ | 0.47 |

The viscosity range of this glass composition is 18 poises to 3 poises in a temperature range of 2300° F. to 2700° F. The glass of the stream 20 of this composition is most satisfactory for use in the method at a temperature of about 2500° providing a viscosity of about 10 poises and hence of highly liquid character.

In the use of the arrangement shown in FIGURE 1 through 3, a continuous stream 20 of molten glass flows from a feeder 18 associated with the forehearth 12, the stream falling by gravity in the axial region of the passage 96.

A combustible mixture of fuel gas and air is delivered through the inlet pipe 104 under comparatively low pressure and the mixture in the combustion chambers or burners 100 and 102 is ignited and burns substantially completely within the combustion chambers or zones. The mixture is burned under confined conditions in the chambers 100 and 102, the burning gases becoming intensely hot and undergoing expansion in the chambers.

The burned gases or products of combustion, at temperature of 3000° F. or more, are projected from the chambers through the passages 110 and outlets 114 as high velocity jets or streams of gas which engage the molten glass of the stream and subdivide or break up the glass into primary filaments or discrete linear bodies 120 which are delivered by the forces of the high velocity jets of gases into the annular attenuating blast delivered from the blower 26. The filaments or linear bodies 120 are attenuated by the high velocity blast from the blower 26 into fine fibers 140. The fibers are collected upon the conveyor flight 46, shown in FIGURE 1, or by other suitable means.

Through this method of processing the glass, the stream of molten glass is subdivided or broken up into primary filaments or discrete linear bodies by the forces of high velocity jets of fluid directed into engagement with the molten glass and the primary filaments or bodies delivered into a gaseous attenuating blast through the use of relatively stationary components, thus eliminating the use of spinners or rotors for subdividing the glass into primary filaments.

The use of a stationary combustion burner for developing high velocity streams of fluid providing the forces for developing the molten glass into primary filaments requires little maintenance because there are no moving parts.

Furthermore, the orifices 114 will be maintained of proper size for longer periods of time without enlargement of distortion. The processing unit 16 is of simple construction and may be manufactured at low cost, thereby substantially reducing the cost of producing attenuated fine fibers from primary filaments.

Where steam is used for the attenuating blast delivered from the annular orifice 136, the steam is at a temperature of 400° F. or more, and when the blast is compressed air, the air delivered through the orifice 136 is at a temperature of about 100° F.

The processing units 16 are compact in size enabling the use of an increased number of units with a forehearth construction, as shown in FIGURE 1, to provide a high fiber yield for the energy expanded in processing the glass.

FIGURES 4 through 6 illustrate another form of apparatus or processing unit for carrying out the method of the invention. In this form the forces utilized in breaking up or subdividing a free falling stream of glass into linear bodies or primary filaments are provided by high velocity streams or jets of gas, such as compressed air, wherein the gas may be preheated to minimize heat losses occurring through the use of gas streams at temperatures lower than the temperature of the glass. The apparatus or processing unit includes a generally cylindrically-shaped housing construction 150 comprising two semicylindrical sections 152 and 154 hingedly joined by a hinged means 156 at a mating region of the sections.

A support means or member 153 is welded or otherwise secured to the housing section 152 for supporting the construction 150. Mounted on the section 154 at a region diametrically opposite the hinge means 156 is a pin 158 upon which is pivoted a manually operable latch member 160, the latch member 160 having an open slot or recess 162. The housing section 152 is provided with a keeper or pin 164 which is received in the slot 162 in the manner shown in FIGURE 5 whereby the latch member 160 secures the housing sections 152 and 154 in closed or normal operative position as shown.

By swinging the latch member 160 in a clockwise direction, as viewed in FIGURE 5, the latch member may be disengaged from the keeper 164 enabling the housing sections to be swung about the hinge means 156 to an open position, as shown in broken lines 154' in FIGURE 4. Extending across a diametrical region of the housing section 152 is a metal partition or plate 168 secured as by welding to the regions 170 of the housing section 152.

Extending across the diametrical region of the housing section 154 and contiguous with the metal partition or plate 168 is a metal partition or plate 172 welded or otherwise secured to the regions 174 of section 154. The partition 168 provides, with the housing section 152, a chamber of semicylindrical shape, while the partition 172, provides with the housing section 154, a semicylindrical chamber 178. Disposed concentric with the axis of the cylindrical housing construction 150 is an annularly-shaped metal wall construction 180 fashioned of two semiannularly shaped sections 182 and 184.

The semiannularly shaped section 182 is joined by welding to the partition or plate 168, and the section 184 likewise joined by welding to the partition or plate 172. The interior cylindrical region defined by the two semiannularly shaped sections 182 and 184 provides a walled passage 188 similar to the passage 96, shown in FIGURE 2, the passage 188 accommodating a free falling glass stream 20' substantially aligned with the central axis of the passage 188. Mounted upon the housing section 152 is a semicircular cover or plate 192 secured by screws 194.

Mounted on the housing section 154 is a similar cover or plate 196 secured by screws 198. The cover plates 192 and 196 are equipped with semicircular recesses 200 which mate to form a circular opening to accommodate a tenon construction 202 provided on the semiannular sections 182 and 184, as shown in FIGURE 6. Secured to the housing section 152 is a threaded bushing 204 registering with an opening 206 in the wall of the housing section 152, the bushing 204 accommodating a pipe 208, shown in FIGURE 6, connected with a supply of gas under pressure for delivery into the chamber 176.

The housing section 154 is equipped with a threaded bushing 210 registering with an opening 212 in the housing wall, the bushing 210 accommodating a pipe (not shown) of the character shown at 208 in FIGURE 6, adapted to be connected with a supply of gas under pressure. Valve means (not shown) of conventional construction are provided for the inlet pipes for controlling flow of gas under pressure into the chambers 176 and 178.

The bottom wall regions of the housing sections 152 and 154 are fashioned with semicircular boss portions 214 and 216 which mate with the semiannular sections 182 and 184, as shown in FIGURE 6. The interior of the hollow configuration provided by the bosses 214 and 216 is defined by semifrusto-conical surfaces 218 which together, provide a frusto-conical shaped passage 220 forming a continuation of the passage 188. The boss portions 214 and 216 are each provided with a comparatively large number of small gas passages or channels 222 in communication with the chambers 176 and 178, the outlets or orifices 224 of the channels opening into the passage 220.

The axes of the channels 222 are angularly inclined slightly downwardly as indicated by the arrows 226 at angles of about seventy degrees with respect to the vertical axis of the cylindrical passage 188. The arrows indicating the paths of travel of gas streams delivered from the orifices 224. The axes of the channels 222 are preferably normal to the taper of the surface 218 defining the frusto-conical shaped passage 220. As shown in FIGURE 4, the channels 222 are slightly askew with respect to radial axes and are generally tangential with respect to the glass stream 20' descending through the passage 188.

The gas streams at high velocities, delivered through the channels 222 in the direction of the arrows 230, impinge the glass stream at regions spaced from its axis and break up the glass of the stream into linear bodies or primary filaments which are entrained and projected by the forces of the gas streams along the paths 226 indicated by the arrows in FIGURE 6.

The streams or jets of gas entrain and convey the linear bodies or primary filaments of glass into an annularly-shaped gaseous blast from a blower of the character shown at 26 in FIGURE 2, employed with the arrangement shown in FIGURES 4 through 6. The annular blast attenuates the discrete linear bodies or primary filaments of glass to fine fibers in the same manner as described in connection with the form of apparatus shown in FIGURE 2.

The gas supplied to the manifolds or chambers 176 and 178 may be compressed air, and the air may be preheated prior to its delivery into the chambers 176 and 178 so that the high velocity streams of heated air from the outlets or nozzles 224 minimizes heat losses from the primary filaments. The velocity of the air streams delivered from the passages 222 should be in a range of from fifty thousand to seventy thousand feet per minute and preferably nearer seventy thousand feet per minute.

The semiannularly shaped sections 182 and 184 defining the walled passage 188 may be of porous metal whereby some air from chambers 176 and 178 may pass or filter through the pores in the metal to minimize the liability of the molten glass to stick or adhere to the walls defining the passage 188 in the event that the glass stream 20' should momentarily deviate from its normal flow path at the axial region of the passage 188.

FIGURES 7 through 9 illustrate another form of apparatus for breaking up or subdividing the glass of a free falling glass stream into discrete bodies or primary filaments by high velocity gas streams delivered from individual nozzles circumferentially disposed about the axis of the stream of glass.

With particular reference to FIGURE 7, the apparatus includes a circular support frame construction 250 comprising two mating semiannular frame sections 252 and 254 preferably of L-shaped cross section, the sections being hinged together by hinge means 256 to effect relative movement between the frame sections 252 and 254 to facilitate access for maintenance.

The opposite ends of the frame sections are in mating relation as shown at region 258 and may be held together by latch means (not shown) similar to that illustrated in FIGURE 5. Welded or otherwise secured to the inner surfaces of the frame sections are inwardly projecting support members or means 260. Adjustably mounted on each of the inwardly extending members 260 is a nozzle construction 262 having a nozzle outlet 264 through which gas under pressure is projected as a high velocity gas stream.

Each gas stream is projected in a path to impinge the glass of the stream 20" and break up or subdivide the glass into discrete linear bodies or primary filaments. The filaments or bodies are entrained by the gas streams and delivered thereby into an annular blast from an annular manifold of the character shown at 26 in FIGURE 2 to attenuate the bodies or primary filaments to fine fibers by blast attenuation.

As particularly shown in FIGURE 8, each of the nozzle constructions is equipped with a member 266 fashioned with a slot 267 adapted to accommodate a winged bolt 268 which is threaded into an opening in the member 260.

By manipulating the winged bolt 268, the nozzle construction 262 may be adjusted to modify the angularity of impingement of the gas streams against the glass of the free falling stream to properly direct the primary filaments into an annular attenuating blast.

In this form of apparatus, air or other gas under pressure is delivered through tubes 270 from a distributing means or plate 272 mounted on a housing 274 which is secured to or associated with an electrically energizable motor 276 spaced from the assembly of nozzles 262. The hollow housing 274 defines a chamber 278 which receives air or other gas through an inlet tube 280 which is connected with a supply of compressed air or other gas. Disposed within the chamber 278 and in contiguous relation with the inner surface of the distributing plate 272 is a valve means or valve disc 282, shown in FIGURE 9, fixedly secured on the motor shaft 284.

The valve member or valve disc 282 is provided with open areas or slots 285 and 286, preferably of different lengths, defined by bridge portions 288. The valve disc 282 is rotated by the motor 276 and cooperates with outlets 290 in the distributor plate 272 connected with the tubes 270 for intermittently obstructing flow of compressed air through openings 290 and tubes 270 successively to the nozzle constructions 262. The velocity of the jets of air from the nozzles 264 should be as high as practicable and preferably upwards of fifty thousand feet per minute.

Through the use of the rotating valve disc or member 282, the air delivered to the nozzles 262 is momentarily interrupted to each of the nozzles in sequence as an assist in disrupting or breaking up the glass of the stream into streamlets or primary filaments conveyed by the gas streams into an annular attenuating blast.

FIGURE 10 illustrates a fiber-forming means or unit of the invention in association with a burner or heat applying means for delivering heat onto the discrete bodies or primary filaments during their traverse from the stream disrupting region into the annular attenuating blast for reducing heat losses from the bodies or primary filaments 120'. The means for disrupting the glass of the stream 20' to form the primaries 120' may be of the character illustrated at 16 in FIGURE 2, or the construction shown at 150 in FIGURE 4, or the arrangement illustrated at 250 in FIGURE 7.

The primary filaments or discrete linear bodies 120' are projected into a high velocity attenuating blast delivered from a blower 26' of the character shown at 26 in FIGURE 2, the high velocity gaseous blast from the blower engaging the primary filaments 120' for attenuating the primary filaments into fine fibers 140'. Surrounding the unit 16 is an annularly-shaped housing or casing 300 which is of hollow configuration providing a manifold chamber 302 adapted to contain a combustible mixture such as fuel gas and air, the mixture being admitted into the manifold chamber 302 from a supply through one or more inlet pipes 304.

The bottom wall of the manifold housing 300 includes an orifice plate 306 preferably fashioned with a plurality of concentrically arranged circular ledges 308 forming an echelon configuration. The orifice plate 306 is provided with a plurality of rows of passageways or channels 310, the channels being of comparatively small diameters.

The fuel and air mixture in the chamber 302 is under comparatively low pressure and the mixture flows downwardly through the channels 310, the mixture being ignited and burned adjacent the primary filaments or primaries 120'.

As the mixture conveying passageways 310 are of small size, ignition of the combustible mixture does not occur in the manifold chamber 302. Through this arrangement the primaries 120' are subjected to heat from the burner thus reducing heat losses from the primary filaments during their traverse toward the attenuating blast from the blower 26'.

Through the arrangement and method of the invention, the glass of a free falling stream is effectively disrupted and subdivided into primary filaments or discrete streamlets eliminating the use of a rotor means for converting or reducing a glass stream to primary filaments. The relatively static fiber-forming units hereinabove described are of compact construction, facilitating the use of several units arranged in adjacent relation each delivering fibers into a collecting zone in the manner show in FIGURE 1.

Thus, a substantial amount of molten glass may be processed per unit of time and thereby attain a high fiber yield from glass supplied by a single forehearth to several fiber forming units.

It is apparent that, within the scope of the invention, modifications and different arrangements may be made other than as herein disclosed, and the present disclosure is illustrative merely, the invention comprehending all variations thereof.

I claim:

1. The method of forming fibers of heat-softened mineral material including flowing a stream of the material from a supply, delivering high velocity streams of gas from regions circumferentially of the material stream into engagement with the material to break up the material into a plurality of primary filaments, conveying the primary filaments substantially radially outwardly from the axis of the stream of material by the forces of the gas streams, engaging the primary filaments with an annular blast of gases moving at high velocities, and attenuating the primary filaments to fibers by the forces of the blast.

2. The method according to claim 1 including burning combustible mixture under confined conditions, and delivering the gases of combustion as the high velocity streams of gas.

3. The method according to claim 1 wherein the mineral material is glass.

4. The method according to claim 1 including applying heat to the primary filaments prior to engaging the primary filaments with the annular gaseous blast.

5. The method of forming fibers from heat-softened glass including flowing a stream of the glass in a vertical path from a supply at a temperature wherein the viscosity of the glass of the stream is within a range between three poises and eighteen poises, projecting high velocity gas streams from regions circumferentially of the stream into engagement with the glass of the stream to disrupt the glass into a plurality of primary filaments, conveying the primary filaments substantially radially outwardly from the axis of the glass stream by the forces of the gas streams, engaging the primary filaments with an annular high velocity gaseous blast, and attenuating the primary filaments into fibers by the forces of the blast.

6. The method according to claim 5 wherein combustible mixture of fuel and air is substantially completely burned within a confined zone and the gases of combustion delivered through orifices providing the high velocity gas streams.

7. The method according to claim 5 wherein the glass of the stream is of a viscosity in a range between eight poises and eleven poises.

8. The method of claim 5 wherein each of the high velocity gas streams is directed downwardly at an angle of substantially seventy degrees with respect to the glass stream.

9. The method of forming fibers from heat-softened glass including establishing a free falling stream of glass of a viscosity in a range between three poises and eighteen poises, directing high velocity gas streams from regions circumferentially of the glass stream toward the glass stream, impinging the gas streams with the glass at regions spaced from the axis of the glass stream, disrupting the glass into a plurality of primary filaments by the forces of the gas streams, conveying the primary filaments by the gas streams substantially radially outwardly from the glass stream, engaging the outwardly moving primary filaments with an annular high velocity gaseous blast with the gases of the blast moving in paths substantially parallel with the axis of the glass stream, and attenuating the primary filaments to fibers by the forces of the gases of the blast.

10. The method according to claim 9 wherein each of the gas streams is directed downwardly at an angle not greater than seventy degrees with respect to the axis of the glass stream.

11. The method according to claim 9 including applying heat to the primary filaments prior to their engagement with the gases of the annular blast.

12. Apparatus of the character disclosed, in combination, means providing an annularly shaped chamber for producing high velocity gases and a central, vertically walled passage with means to feed a stream of heat-softened glass from a supply through said passage, the wall defining the passage having a plurality of circumferentially arranged channels in communication with the chamber, means for delivering gas under pressure to said passage from outlets of the channels for projection from the outlets as high velocity gas streams, each of said channels being disposed to direct the gas streams into engagement with the stream of heat-softened glass at a region spaced from the axis of the glass stream to form primary filaments of the glass, and means providing a high velocity annular gaseous blast engaging the primary filaments for attenuating the filaments to fine fibers.

13. The combination according to claim 12 including heating means surrounding the chamber for applying heat to the primary filaments.

14. The combination of claim 12 wherein each of the channels is inclined downwardly at an angle of about seventy degrees with respect to the axis of the glass stream.

References Cited

UNITED STATES PATENTS

| 3,282,668 | 11/1966 | Mabra | 65—5 |
| 3,340,334 | 9/1967 | Feldmann et al. | 264—12 |
| 3,357,808 | 12/1967 | Eberle | 65—16 |

FOREIGN PATENTS

| 928,865 | 6/1963 | Great Britain. |
| 1,017,516 | 10/1957 | Germany. |

DONALL H. SYLVESTER, *Primary Examiner.*

R. L. LINDSAY, JR., *Assistant Examiner.*

U.S. Cl. X.R.

264—12; 65—16; 18—8